United States Patent [19]

Derber et al.

[11] Patent Number: 4,904,765
[45] Date of Patent: Feb. 27, 1990

[54] DYE MIXTURES CONTAINING AN OIL-SOLUBLE DYE AND AN ACID-EXTRACTABLE DYE

[75] Inventors: Bernd Derber, Limburgerhof; Rudolf Denninger, Ludwigshafen, both of Fed. Rep. of Germany

[73] Assignee: BASF Aktiengesellschaft, Ludwigshafen, Fed. Rep. of Germany

[21] Appl. No.: 73,143

[22] Filed: Jul. 14, 1987

[30] Foreign Application Priority Data

Aug. 13, 1986 [DE] Fed. Rep. of Germany ....... 3627461

[51] Int. Cl.$^4$ .................... C09B 29/085; C10L 1/10; C10L 1/22; C10M 1/32
[52] U.S. Cl. ......................... 534/573; 44/59; 534/829; 534/832; 534/856; 534/858
[58] Field of Search ............. 534/573 L, 573 M, 856, 534/858; 44/59

[56] References Cited

U.S. PATENT DOCUMENTS

| | | | |
|---|---|---|---|
| 3,004,821 | 10/1961 | Gano | 534/573 X |
| 3,734,857 | 5/1973 | Moiso et al. | 534/856 X |
| 3,862,120 | 1/1975 | Orelup | 534/573 X |
| 4,210,414 | 7/1980 | Hansen et al. | 534/573 X |

FOREIGN PATENT DOCUMENTS 768659  7/1971  Belgium ............... 534/573

*Primary Examiner*—Floyd D. Higel
*Attorney, Agent, or Firm*—Oblon, Spivak, McClelland, Maier & Neustadt

[57] ABSTRACT

Dye mixtures contain an oil-soluble dye and a dye of the formula

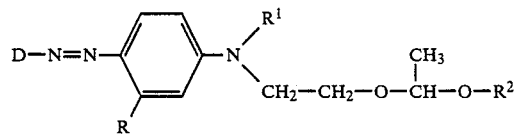

where D is phenyl which is unsubstituted or substituted by methyl or methoxy, R is hydrogen or methyl, $R^1$ is hydrogen or $C_1$–$C_4$-alkyl and $R^2$ is $C_3$- or $C_4$-alkyl.

The mixtures according to the invention are preferably used for coloring and marking mineral oil products.

8 Claims, No Drawings

DYE MIXTURES CONTAINING AN OIL-SOLUBLE DYE AND AN ACID-EXTRACTABLE DYE

The present invention relates to dye mixtures containing an oil-soluble dye and a dye of the formula I

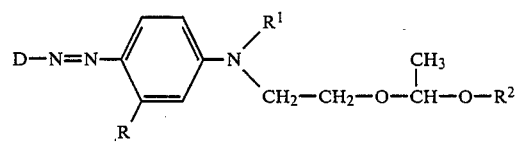

where D is phenyl which is unsubstituted or substituted by methyl or methoxy, R is hydrogen or methyl, $R^1$ is hydrogen or $C_1$-$C_4$-alkyl and $R^2$ is $C_3$- or $C_4$-alkyl.

Preferred dye mixtures are those which, in addition to an oil-soluble dye, contain a dye of the formula I where D is phenyl, R is hydrogen or methyl, $R^1$ is ethyl and $R^2$ is isobutyl.

The novel dye mixtures are advantageously prepared and used in the form of solutions. Preferred solvents are aromatic hydrocarbons, such as toluene or xylene. The oil-soluble dyes and the dyes of the formula I are very readily soluble in the stated solvents. However, in order to avoid the resulting solutions having too high a viscosity, a dye concentration of from 30 to 50% by weight, based on the solution, is generally chosen.

The dyes of the formula I and the oil-soluble dye are advantageously dissolved in a weight ratio of from 1:3 to 3:1 in the solvents. In principle, the ratio can of course be chosen completely freely. Th mixtures according to the invention may contain one or more oil-soluble dyes and one or more dyes of the formula I.

Examples of oil-soluble dyes for the novel mixtures are the compounds which are listed under Solvent Dyes in the Color Index and may belong to various dye classes. The choice of the oil-soluble dyes depends on the desired hue. The compounds of the formula I are in fact yellow and, together with the oil-soluble dye, must give the desired hue. Typical examples of oil-soluble dyes are the dyes of the formulae II to IX:

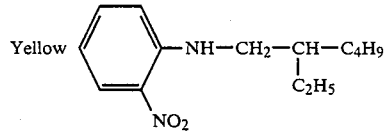

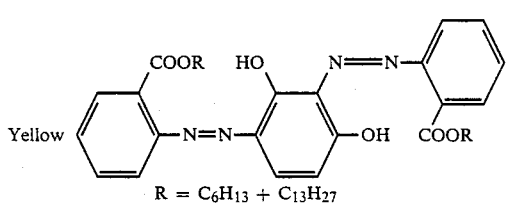

R = $C_6H_{13}$ + $C_{13}H_{27}$

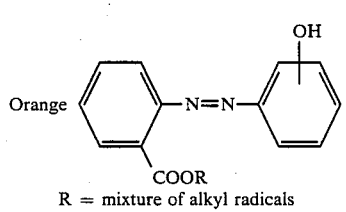

R = mixture of alkyl radicals

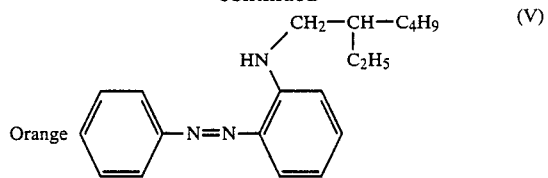

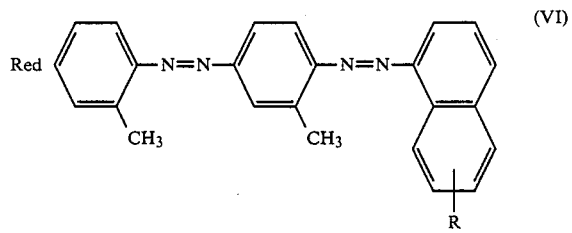

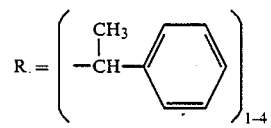

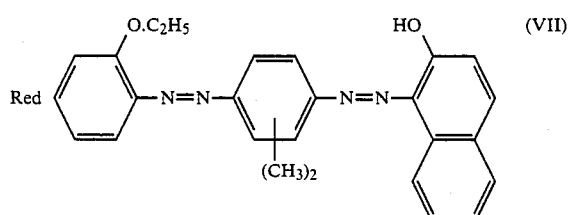

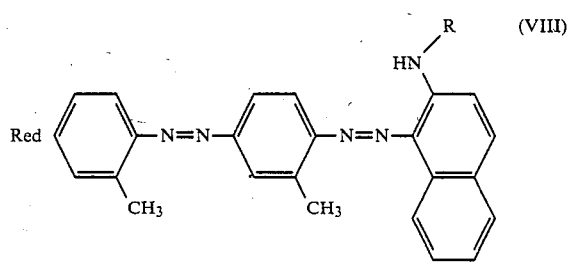

R = $C_8H_{17}$ + $C_{13}H_{27}$

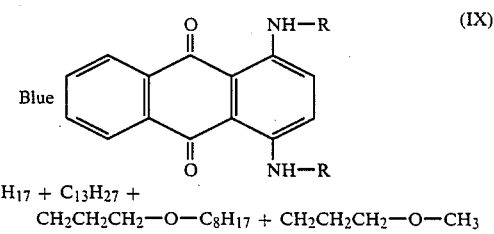

R = $C_8H_{17}$ + $C_{13}H_{27}$ + $CH_2CH_2CH_2$—O—$C_8H_{17}$ + $CH_2CH_2CH_2$—O—$CH_3$

The novel dye mixtures are particularly useful for dyeing mineral oil products which also have to be marked, for example for tax reasons. In order to keep the costs of marking as low as possible, it is desirable to carry out dyeing using dyes which have a very high color yield; however, even dyes having a high color strength and used in high dilution in mineral oil products are no longer visually perceptible.

The mixtures according to the invention have the advantage that the compounds of the formula I, in addition to their dye character, are also suitable as marking substances since they can be extracted from the mineral oil products with aqueous or aqueous alcoholic acids and thus give an intense red coloration. This behavior is surprising since DE-A-2 129 590, in which dyes of the formula I are described, expressly points out that these dyes cannot be extracted from mineral oil products with the aid of aqueous acidic solutions.

By means of the novel dye mixtures, marked mineral oil products can be detected very easily even when the marking substances are present in a concentration of only about 0.1 ppm. The fact that the tests for detecting the novel mixtures can be carried out in a simple manner is of particular importance. As a rule, it is sufficient if about 100 ml of the mineral oil product to be tested are shaken with 10 ml of the aqueous acid in order to obtain the color reaction.

Suitable acids for extracting the marking substances are predominantly mineral acids, eg. hydrochloric acid or sulfuric acid, but in particular aqueous or aqueous alcoholic (advantageously ethanolic) hydrochloric acid in a concentration of about 3–20, preferably 5–10, % by weight.

The Examples, in which parts and percentages are by weight, unless stated otherwise, illustrate the use of the novel mixtures. In all Examples, the dye of the formula I which was chosen was that in which D is phenyl, R is hydrogen, $R^1$ is ethyl and $R^2$ is isobutyl.

EXAMPLE 1

Unleaded motor gasoline is marked with a dye mixture of the following composition:
40 parts of a 30% strength solution of the dye I in xylene and
60 parts of a 60% strength solution of the blue dye IX in toluene.

20 mg of the stated mixture are added per liter of fuel. The liquid assumes an intense bluish green coloration.

The dye content can be determined quantitatively by colorimetric measurement at the wavelengths of 416 and 646 nm which are characteristic of the blue dye and correspond to the absorption maxima.

At very high dilutions, however, this method is no longer satisfactory. At a dilution of only 1:9 with uncolored gasoline, the green coloration is no longer visually detectable. However, the content of the compound of the formula I described above still permits analysis by the following method, even at a dilution of 1:20.

100 ml of the motor gasoline to be tested are shaken vigorously with 10 ml of a mixture of 5 ml of 10% strength hydrochloric acid and 5 ml of ethanol (for example for 5 minutes on a suitable shaking apparatus). During this procedure, the alcoholic aqueous phase assumes a clearly detectable pink coloration. After standing for a short time, after which both phases have separated, the pink layer can be compared colorimetrically with a solution of known concentration and the dye content thus determined quantitatively. In this way, a mixture of the marked motor gasoline with 20 times the amount of unmarked gasoline can still be detected satisfactorily.

EXAMPLE 2

Kerosene is marked with 20 ppm of the following dye mixture:
40 parts of a 30% strength solution of the dye I in xylene and
60 parts of a 60% strength solution of the red dye VIII in a high boiling mixture of aromatics.

Dilutions with unmarked mineral oil can be detected down to a mixing ratio of about 1:20 using the following method:
100 ml of the solution to be tested are shaken vigorously with 5 ml of 10% strength hydrochloric acid. After the mixture has stood for a short time, the pink coloration of the aqueous phase is evaluated.

In the case of the undiluted dye solution in kerosene, quantitative determination of the content of red dye can also be carried out according to DIN 51,426, although this method fails with very dilute mixtures. In this case, only the method described above for detecting dye I gives the desired result.

EXAMPLE 3

Light fuel oil having a honey-yellow natural color is marked with a dye mixture of the following composition:
40 parts of a 30% strength solution of the dye I in xylene and
60 parts of a yellow liquid dye of the formula II.

20 ppm of the above mixture are added. If 100 ml of this yellow fuel oil are shaken with 5 ml of 10% strength hydrochloric acid, the aqueous phase assumes a dark red coloration.

If fuel oil marked in the above manner is added to unmarked diesel oil in a ratio of 1:10 or even 1:20, mixing of the substances cannot be detected visually. However, in this case too mixing is readily detectable by shaking with acid, since the latter assumes a clearly detectable (and measurable) pink coloration during this procedure.

We claim:

1. A dye mixture, comprising an oil-soluble dye and one or more dyes of the formula I:

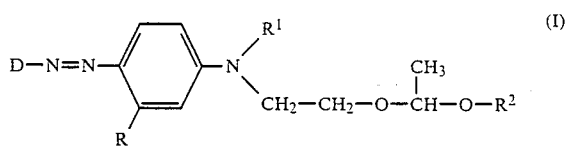

wherein D is phenyl which is unsubstituted or substituted by methyl or methoxy; R is hydrogen or methyl; $R^1$ is hydrogen or $C_1$-$C_4$-alkyl; and $R^2$ is $C_3$- or $C_4$-alkyl, and wherein said dye of the formula I in said mixture is extractable from mineral oil products by aqueous or aqueous alcoholic hydrochloric acid.

2. The dye mixture as claimed in claim 1, wherein D is phenyl, R is hydrogen or methyl, $R^1$ is ethyl and $R^2$ is isobutyl.

3. The dye mixture as claimed in claim 1, wherein said aqueous alcoholic hydrochloric acid is an aqueous ethanolic hydrochloric acid.

4. The dye mixture as claimed in claim 1, wherein said hydrochloric acid is present in a concentration of about 3 to 20% by weight.

5. The dye mixture as claimed in claim 4, wherein said hydrochloric acid is present in a concentration of about 5 to 10% by weight.

6. The dye mixture as claimed in claim 1, wherein said oil-soluble dye is selected from the group consisting of:

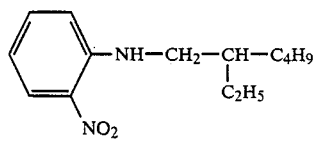
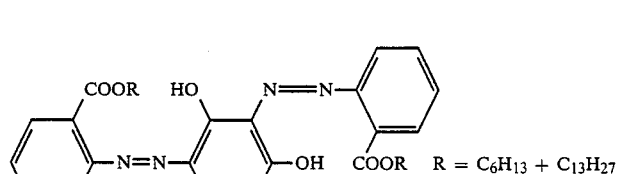
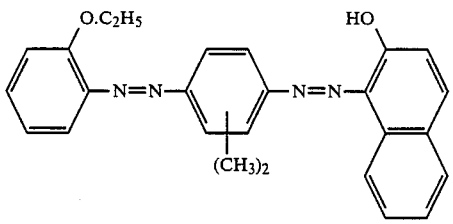
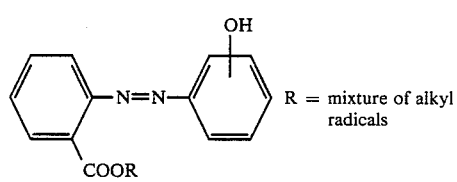
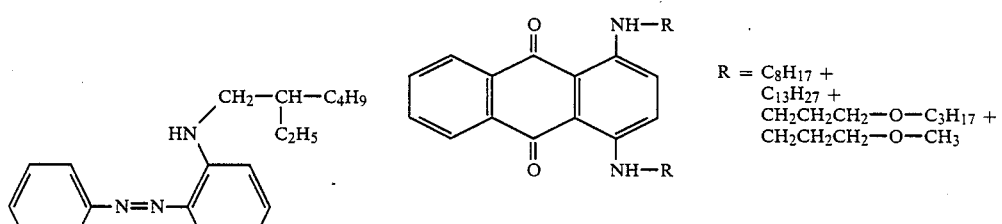
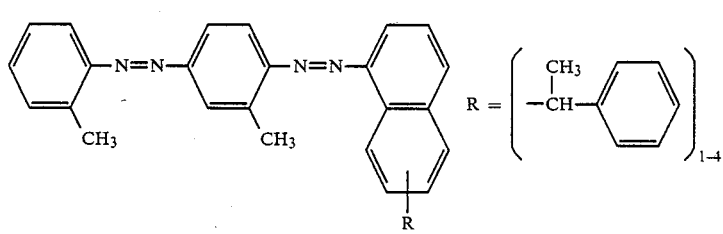
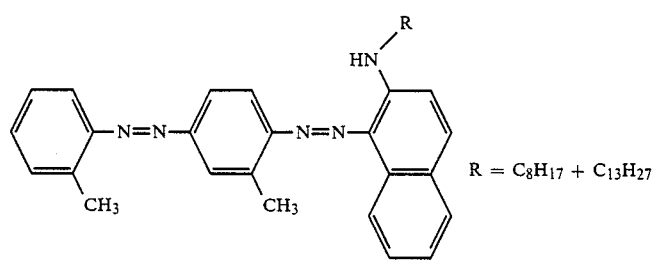
7. The dye mixture as claimed in claim 1, wherein said oil-soluble dye is used in a concentration of about 30–50% by weight.
8. The dye mixture as claimed in claim 1, wherein said dye of the formula (I) and the oil-soluble dye are used in a weight ratio of from 1:3 to 3:1.
* * * * *

UNITED STATES PATENT AND TRADEMARK OFFICE
CERTIFICATE OF CORRECTION

PATENT NO. : 4,904,765

DATED : Feb. 27, 1990

INVENTOR(S) : Bernd Derber, et al

It is certified that error appears in the above-identified patent and that said Letters Patent is hereby corrected as shown below:

The second inventor's last name is incorrect,
 "Rudolf Denninger" should read:

--Rudolf Senninger--

Signed and Sealed this

Fourteenth Day of May, 1991

*Attest:*

HARRY F. MANBECK, JR.

*Attesting Officer*     *Commissioner of Patents and Trademarks*